RE 25430

United States Patent Office 3,017,431
Patented Jan. 16, 1962

3,017,431
POLYHALOOCTAHYDROALKANONAPHTHA-
LENEDICARBOXYLIC ACIDS AND METH-
OD OF PREPARATION THEREOF
Louis Schmerling, Riverside, Ill., assignor, by mesne assignments, to Universal Oil Products Company, Des Plaines, Ill., a corporation of Delaware
No Drawing. Filed Mar. 31, 1958. Ser. No. 724,832
7 Claims. (Cl. 260—514)

This invention relates to compositions of matter possessing insecticidal properties and more particularly to a method of preparing halo-substituted polyhydroalkanonaphthalenedicarboxylic acids.

An object of this invention is to prepare halo-substituted polyhydroalkanonaphthalenedicarboxylic acids.

A further object of this invention is to prepare compositions of matter useful as insecticides, said compounds consisting of halo-substituted polyhydroalkanonaphthalenedicarboxylic acids and homologues and analogues thereof.

One embodiment of this invention is found in a process for the preparation of a halo-substituted polyhydroalkanonaphthalenedicarboxylic acid which comprises condensing a conjugated aliphatic diene with an olefinic dicarboxylic acid, further condensing the resultant condensation product with a halocycloalkadiene, and recovering the desired halo-substituted polyhydroalkanonaphthalenedicarboxylic acid.

A further embodiment of this invention is found in a process for the preparation of a halo-substituted octahydroalkanonaphthalenedicarboxylic acid which comprises condensing 1,3-butadiene with an olefinic dicarboxylic acid at an elevated temperature, further condensing the resultant cyclohexenedicarboxylic acid with a halocycloalkadiene at an elevated temperature, and recovering the desired halo-substituted octahydroalkanonaphthalenedicarboxylic acid.

A still further embodiment of the invention is found in a process for the preparation of a halo-substituted octahydroalkanonaphthalenedicarboxylic acid which comprises condensing a conjugated aliphatic diene with maleic acid at an elevated temperature, and further condensing the resultant cyclohexenedicarboxylic acid with a halocycloalkadiene at an elevated temperature, and recovering the desired halo-substituted octahydroalkanonaphthalenedicarboxylic acid.

A specific embodiment of the invention resides in a process for the preparation of a halo-substituted octahydromethanonaphthalenedicarboxylic acid which comprises condensing 1,3-butadiene with maleic acid at an elevated temperature, condensing the resultant 1,2,3,6-tetrahydrophthalic acid with hexachlorocyclopentadiene at an elevated temperature, and recovering the resultant 5,6,7,8,9,9-hexachloro - 1,2,3,4,4a,5,8,8a - octahydro-5,8-methano-2,3-naphthalenedicarboxylic acid.

Yet another embodiment of the invention is found in an insecticidal composition comprising a halo-substituted polyhydroalkanonaphthalenedicarboxylic acid and a liquid carrier therefor.

Other objects and embodiments referring to alternative conjugated aliphatic dienes, unsaturated dicarboxylic acids and halocycloalkadienes will be found in the following further detailed description of the invention.

It has now been discovered that the reaction product resulting from the condensation of a conjugated aliphatic diene with an unsaturated dicarboxylic acid followed by further condensation of the resultant product with a halo-substituted cycloalkadiene, namely, a halo-substituted polyhydromethanonaphthalenedicarboxylic acid such as, for example, 5,6,7,8,9,9 - hexachloro - 1,2,3,4,4a,5,8,8a-octahydro-5,8-methano-2,3-naphthalenedicarboxylic acid, will exhibit insecticidal properties especially against houseflies, or, if so desired, may be useful as intermediates in the preparation of pharmaceutical, resins, plastics or other organic chemicals. For purposes of this invention, the term "halo-substituted polyhydromethanonaphthalenedicarboxylic acid," when used in the specification and in the appendant claims, will refer to both mono- and polyhalo-substituted acids as well as to homologues and analogues of the naphthalenedicarboxylic acids.

Conjugated aliphatic dienes which may be used in this invention include 1,3-butadiene (hereinafter referred to as butadiene), 2-methyl-1,3-butadiene (isoprene), 1,3-pentadiene (piperylene), 1,3-hexadiene, 2,4-hexadiene, 2,3-dimethyl-1,3-butadiene, 1,3 - heptadiene, 2,4 - heptadiene, conjugated octadienes, nonadienes, etc. Olefinic dicarboxylic acids which may be used include maleic acid, fumaric acid, itaconic acid, citraconic acid, glutaconic acid, mesaconic acid, ethylidenemalonic acid, vinylmalonic acid, allylmalonic acid, propylidenemalonic acid, hydromuconic acid, pyrocinchonic acid, vinylsuccinic acid, allylsuccinic acid, carbocaprolactonic acid, teraconic acid, the other isomeric hexenedioic, heptenedioic, octenedioic, nonenedioic acids, etc. For the purposes of the present specification and claims, the term "olefinic dicarboxylic acid," will refer to a dicarboxylic acid containing only one ethylenic double bond, and comprised only of carbon, hydrogen and oxygen, said acid containing up to about eighteen carbon atoms. Also, not only the acids but also their intramolecular dehydration products (for example, maleic anhydride) are included in the term, "olefinic dicarboxylic acid." It is to be understood that the abovementioned conjugated aliphatic dienes and olefinic dicarboxylic acids are only representatives of the class of compounds which may be used and that the present invention is not necessarily limited thereto.

The Diels-Alder condensation between the aforementioned conjugated aliphatic dienes and unsaturated dicarboxylic acids will take place at an elevated temperature in the range of from about 80° to about 250° C. or more, the preferred range being from about 100° to about 200° C., and usually at a pressure sufficient to maintain at least part of the reactants in a liquid phase, said pressure being in the range of from about atmospheric to about 100 atmospheres or more. The aforementioned pressure may be effected by the introduction of the conjugated aliphatic diene, as in the case of butadiene, into the reaction vessel, or by pressuring nitrogen or an inert gas into said vessel.

An example of the aforementioned Diels-Alder condensation is illustrated by the following equation in which 1,3-butadiene and maleic acid are condensed to form 1,2,3,6-tetrahydrophthalic acid.

I $H_2C=CH-CH=CH_2$ + $\begin{matrix} HC-COOH \\ \parallel \\ HC-COOH \end{matrix}$ ⟶ 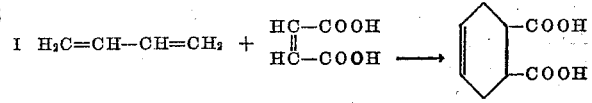

Under some circumstances the acid may be partially dehydrated to form 1,2,3,6-tetrahydrophthalic anhydride.

The tetrahydrophthalic acid or homologue thereof is further condensed with a conjugated halocycloalkadiene to form the desired reaction product. For purposes of this invention the term "halocycloalkadiene" is used in the specification and appendant claims will refer to both mono- and polyhalo-substituted cycloalkadienes. Examples of the halo-substituted cycloalkadienes which may be used in the process of this invention include chloro-substituted 1,3-cyclopentadienes (hereinafter referred to as cyclopentadienes) such as 1 - chlorocyclopentadiene, 2 - chlorocyclopentadiene, 1,2 - dichlorocyclopentadiene, 1,5 - dichlorocyclopentadiene, 1,2,3 - trichlorocyclopentadiene, 1,2,3,4 - tetrachlorocyclopentadiene, 1,2,3,4,5-pentachlorocyclopentadiene, hexachlorocyclopentadiene, bromo-substituted cyclopentadienes such as 1-bromocyclopentadiene, 1,2-dibromocyclopentadiene, 1,2,3 - tribromocyclopentadiene, 1,2,3,4 - tetrabromocyclopentadiene, 1,2,3,4,5-pentabromocyclopentadiene, hexabromocyclopentadiene, chloro-substituted 1,3 - cyclohexadienes (hereinafter referred to as cyclohexadienes) such as 1-chlorocyclohexadiene, 1,2 - dichlorocyclohexadiene, 1,3-dichlorocyclohexadiene, 4,5 - dichlorocyclohexadiene, 4,6-dichlorocyclohexadiene, 1,2,3 - trichlorocyclohexadiene, 1,2,4-trichlorocyclohexadiene, 1,2,3,4 - tetrachlorocyclohexadiene, pentachlorocyclohexadiene, hexachlorocyclohexadiene, octachlorocyclohexadiene, bromo-substituted cyclohexadienes such as 1-bromocyclohexadiene, 1,2-dibromocyclohexadiene, 1,3 - dibromocyclohexadiene, 4,5-dibromocyclohexadiene, 4,6 - dibromocyclohexadiene, 1,2,3-tribromocyclohexadiene, 1,2,4 - tribromocyclohexadiene, 1,2,3,4 - tetrabromocyclohexadiene, pentabromocyclohexadiene, hexabromocyclohexadiene, octabromocyclohexadiene, etc. In addition, it is also contemplated within the scope of this invention that the cyclopentadienes and cyclohexadienes containing more than one species of halogen substituents may also be used, although not necessarily with equivalent results, such compounds including 1 - chloro - 2 - bromocyclopentadiene, 1,2-dichloro - 5,5 - dibromocyclopentadiene, 2,3-dichloro-5,5-dibromocyclopentadiene, 1-chloro-2-bromocyclohexadiene, 1,2-dichloro-3-bromocyclohexadiene, 1,2-dichloro-3,4-dibromocyclohexadiene, etc.

The condensation reaction between the halo-substituted and the cyclohexenedicarboxylic acids is also of the Diels-Alder type and may be effected at elevated temperatures in the range of from about 50° to about 250° C., the preferred range being from about 100° to about 200° C. and at atmospheric or superatmospheric pressures ranging to about 100 atmospheres or more, the pressure being such as to maintain at least a portion of the reactants in the liquid phase at the reaction temperature. An example of this type of condensation is illustrated by the following equation in which the 1,2,3,6-tetrahydrophthalic acid which was prepared in Equation I above is reacted with hexachlorocyclopentadiene to prepare the desired reaction product which in this case is 5,6,7,8,9,9-hexachloro-1,2,3,4,4a,5,8,8a-octahydro - 5,8 - methano - 2,3-naphthalenedicarboxylic acid.

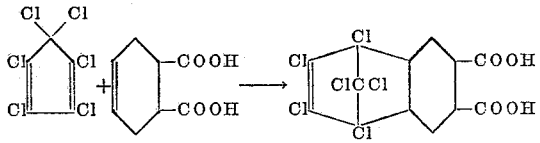

Some of the anhydride corresponding to the dicarboxylic acid may also be formed by dehydration of the acid.

If so desired, both Diels-Alder condensations may be effected in the presence of an inert organic solvent including aromatic solvents such as benzene, toluene, o-, m- and p-xylene, ethylbenezene, etc.; saturated paraffins and cycloparaffins such as pentane, heptane, hexane, cyclopentane, cyclohexane, cycloheptane, methylcyclopentane, etc.; low molecular weight alcohols such as methyl alcohol, ethyl alcohol, propyl alcohol, isopropyl alcohol, butyl alcohol, etc.; ethers such as dimethyl ether, diethyl ether, dipropyl ether, etc.; or acetone, acetic acid, etc. The aromatic hydrocarbons are usually the preferred solvents.

The process of this invention may be effected in any suitable manner and may comprise either a batch or a continuous type operation. For example, when a batch type operation is used, a quantity of the starting materials comprising the conjugated aliphatic diene, if in liquid form, and the olefinic dicarboxylic acid, usually in an approximately 1:1 mole ratio is placed in a reaction vessel such as an alkylating flask, a rotating autoclave, etc. As hereinbefore set forth, if so desired, this reaction may take place in the presence of an inert organic solvent. The autoclave is sealed and an inert gas such as nitrogen may be pressured in while the reaction vessel is being heated to the desired reaction temperatures. However, if the conjugated aliphatic diene is in gaseous form the olefinic dicarboxylic acid (and solvent, if used) may first be placed in the reaction vessel which is subsequently sealed and the conjugated aliphatic diene is then pressured into said vessel, usually in some molar excess over the olefinic acid. The vessel and contents thereof are maintained at the desired temperature for a predetermined period of time. Upon completion of the reaction, the reactor and contents thereof are allowed to cool to room temperature and the desired condensation product is recovered and separated from any unreacted starting material and/or side reactions by conventional means, for example, fractional distillation, crystallization, etc. The desired cyclohexenedicarboxylic acid is then placed in a second reaction vessel or returned to the first reaction vessel and the second step of the invention, namely, condensation of said acid with a halo-substituted cycloalkadiene, is effected. These materials are subjected to predetermined conditions of temperature, pressure and time after which the vessel and contents thereof are cooled to room temperature and the desired halosubstituted polyhydroalkanonaphthalenedicarboxylic acid is separated and recovered by conventional means.

Another type of operation which may be used is of the continuous type. In this method the starting materials comprising the conjugated aliphatic diene and the olefinic dicarboxylic acid are continuously charged through separate lines to a reactor which is maintained at suitable operating conditions of temperature and pressure. The reactor may comprise an unpacked vessel or coil or may be lined with an adsorbent packing material such as fire brick, alumina, dehydrated bauxite and the like. If so desired, an inert organic solvent of the type hereinbefore set forth may also be continuously charged to the reactor through separate means or may be admixed with one or both of the starting materials before entry into said reactor and charged thereto in a single stream. After a predetermined residence time has been completed the condensation product is withdrawn and separated from the reactor effluent, the starting materials being separated and recycled for further use as a portion of the starting materials. The aforesaid condensation product, comprising a cyclohexenedicarboxylic acid, is then continuously charged to a second reactor also maintained at the desired operating conditions of temperature and pressure, and similar to the one hereinbefore described, the halo-substituted cycloalkadiene also being continuously charged to said reactor through separate means, or admixed with the cyclohexenedicarboxylic acid and charged to said reactor in a single stream. Upon completion of the desired residence time in the second reactor, the halo-substituted polyhydroalkanonaphthalenedicarboxylic acid is continuously withdrawn, separated and purified by conventional means.

The physical properties of the present halo-substituted polyhydroalkanonaphthalenedicarboxylic acids and the effects they have on entomological forms of life make them particularly desirable as insecticides and insect repellants, the particular compounds having many of the features desired of materials for this purpose. They are, for example, toxic to insects which are destructive of plant life and materials normally subject to insect infestation, their toxic effects being manifested by contact of the poison with the insect. The insecticides comprising the present compounds are thus effective against chewing as well as sucking types of insects. The compounds are sufficiently volatile so that when applied to plant life intended for subsequent human consumption the plants, when harvested and after allowing a reasonable time for evaporation of the applied insecticide therefrom, retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water or combined with an oil and emulsified with water by the addition of an emulsifying agent such as a surface active agent to the mixture of components. The latter solvents and dispersants may also be employed for the specific purpose of reducing the concentration of insecticide to the desired level in a specific insecticidal formulation. The particular formulation of active components in combination with the solvent or dispersant will depend upon its application. Compositions containing as high as 20% of active component may be preferred in some instances where deep penetration of the insecticide is desired, as in the treatment of fibrous material such as wood for extinction of a particular infestation, for example, wood termites. For other purposes, the required concentration of active component in the formulation may be as low as 0.1% as, for example, in the treatment of vapors for destroying moth larvae.

In utilizing the present insecticidal compounds against most insects, a composition containing from about 0.1 to about 5% by weight of active component is highly effective. The choice of the most desirable solvent or dispersant further depends upon the method utilized to apply the insecticidal composition to the infested article. For example, a low molecular weight, normally gaseous carrying agent for the active insecticide composition such as propane, butane, the Freons, etc. may be compressed and liquefied into a small bomb containing the insecticide. Upon release of pressure from the bomb, the liquefied carrier vaporizes and suspends a quantity of the active component thereon, thus providing a convenient spraying method for applying the insecticide. The active component may also be dissolved in a liquid carrier such as kerosene, an alcohol, ester, ketone, etc., and the resulting solution atomized by a suitable spraying device.

Examples of insecticidal compositions which may be prepared according to the process of this invention include 5.6.7,8,9,9-hexachloro-1,2,3,4,4a,5,8,8a - octahydro-5,8-methano-2,3-naphthalenedicarboxylic acid, 5,6,7,8,9,9-hexachloro-2-carboxy - 1,2,3,4,4a,5,8,8a - octahydro - 5,8-methano-2-naphthaleneacetic acid, 5,6,7,8,9,9-hexachloro-3-carboxy-1,2,3,4,4a,5,8,8a - octahydro - 5,8 - methano-2-naphthaleneacetic acid, 5,6,7,8,9,9-hexachloro-1,2,3,4,4a-5,8,8a-octahydro-5,8-methano-2-naphthalene-succinic acid, 5,6,7,8,9,9-hexachloro - 1,2,3,4,4a,5,8,8a - octahydro-5,8-methano-2-naphthalenemalonic acid, 5,6,7,8,9,9 - hexabromo - 1,2,3,4,4a,5,8,8a - octahydro - 5,8 - methano-2,3-naphthalenedicarboxylic acid, 5,6,7,8,9,9 - hexabromo-2-carboxy - 1,2,3,4,4a,5,8,8a - octahydro - 5,8 - methano-2-naphthaleneacetic acid, 5,6,7,8,9,9-hexabromo-1,2,3,4,4a,-5,8,8a-octahydro-5,8-methano-2-naphthalene-succinic acid, etc. It is to be understood that the abovementioned compounds are only representatives of the class of compounds which may be prepared and that the present invention is not necessarily limited thereto.

The following examples are given to illustrate the process of the present invention, which, however, are not intended to limit the generally broad scope of the present invention in strict accordance therewith.

*Example I*

A glass liner containing a mixture of 58 g. (0.5 mole) of maleic acid and 150 cc. of toluene is sealed into an autoclave and about 40–45 g. of 1,3-butadiene is pressured in. The autoclave and contents are heated to a temperature of about 175° C. and maintained at this temperature for a period of about 3 hours at the end of which time the autoclave and contents thereof are cooled to room temperature, the desired product is separated by extracting the reaction product with dilute alkali, followed by acidification and fractional crystallization. The fraction, comprising 1,2,3,6-tetrahydrophthalic acid, is separated and mixed with molecular proportion of hexachlorocyclopentadiene and xylene solvent. The mixture is heated to a temperature of about 150° C. and maintained thereat for an additional period of about 2 hours. At the end of this time the flask and contents thereof are again allowed to cool to room temperature, and the product is subjected to fractional crystallization. The desired reaction product, comprising 5,6,7,8,9,9 - hexachloro - 1,2,3,4,4a,5,8,8a - octahydro - 5,8 - methano - 2,3-naphthalenedicarboxylic acid is separted and recovered. Some of the corresponding anhydride is also recovered.

*Example II*

A mixture of 65 g. (0.5 mole) of itaconic acid, 35 g. of butadiene, and 150 cc. of xylenes in a glass liner cooled to −78° C. is sealed into an autoclave which is then heated to a temperature of about 175° C. and maintained thereat for a period of about 2 hours, at the end of which time the autoclave and contents thereof are cooled to room temperature, the excess pressure is vented and the reaction product, comprising (1-carboxy-1,2,3,6-tetrahydrophenyl)acetic acid is separated by fractional crystallization.

One molecular proportion of the aforementioned condensation product and one molecular proportion of hexachlorocyclopentadiene are placed in a flask together with xylene and heated to a temperature of about 165° C. for a period of about 6 hours. At the end of this period of time the flask and contents thereof are cooled to room temperature and the desired reaction product, comprising 5,6,7,8,9,9-hexachloro - 2 - carboxy-1,2,3,4,4a,5,8,8a-octahydro-5,8-methano-2-naphthaleneacetic acid is separated and recovered by fractional crystallization.

*Example III*

A mixture of 65 g. (0.5 mole) of glutaconic acid, 40 g. of butadiene and 100 g. of toluene is heated at about 175° C. in accordance with the procedure described in Example II. The condensation product, comprising (2-carboxy-1,2,3,6-tetrahydrophenyl)acetic acid (or 1,2,3,6-tetrahydro-o-homophthalic acid) is recovered.

One molecular proportion of this acid is heated under reflux with one molecular proportion of hexachlorocyclopentadiene and excess xylene at a temperature of about 160° C. for a period of about 6 hours after which the desired reaction product, comprising 5,6,7,8,9,9-hexachloro - 3 - carboxy-1,2,3,4,4a,5,8,8a-octahydro-5,8-methano-2-naphthaleneacetic acid is separated and recovered by conventional means.

*Example IV*

A mixture of 80 g. of allylsuccinic acid, 45 g. of 2,3-dimethyl-1,3-butadiene, and 150 g. of toluene is treated as described in Example II above. The condensation product of this reaction, comprising (1,2,3,6-tetrahydro-4,5-dimethylbenzyl)succinic acid is treated with hexachlorocyclopentadiene in a manner similar to that described above and the desired product, comprising (5,6,7,8,9,9-hexachloro - 1,2,3,4,4a,5,8,8a - octahydro-4a,8a-dimethyl-5,8-methano-2-naphthylmethyl)succinic acid is separated and recovered.

*Example V*

A mixture of 65 g. of vinylsuccinic acid and 100 cc. of benzene is treated in a manner similar to that set forth in Example I above with 40 g. of 1,3-butadiene. The desired condensation product comprising 1,2,3,6-tetrahydrophenylsuccinic acid is recovered and treated with one molecular proportion of hexachlorocyclopentadiene in a manner similar to that hereinbefore set forth. The final condensation product comprising 5,6,7,8,9,9-hexachloro - 1,2,3,4,4a,5,8,8a - octahydro-5,8-methano-2-naphthalenesuccinic acid is separated and recovered.

*Example VI*

An insecticidal composition is prepared by dissolving 1 g. of 5,6,7,8,9,9-hexachloro-1,2,3,4,4a,5,8,8a-octahydro-5,8-methano-2,3-naphthalenedicarboxylic acid in 2 cc. of benzene and emulsifying the resultant solution with 100 cc. of water using Triton X-100 as the emulsifying agent. The resulting solution is sprayed into a cage containing houseflies resulting in a 100% knockdown. Similar tests using the compounds prepared in Examples II to V above show similar results.

I claim as my invention:

1. A halo-substituted polyhydroalkanonaphthalenedicarboxylic acid in which the halogen is selected from the group consisting of chlorine and bromine, said acid resulting from the Diels-Alder condensation, at a temperature of from about 50° C. to about 250° C., of a conjugated halocycloalkadiene selected from the group consisting of conjugated halocyclopentadienes and halocyclohexadienes in which the halogen is selected from the group consisting of chlorine and bromine, with the condensation product, formed at a temperature of from about 80° C. to about 250° C., of a conjugated aliphatic diene hydrocarbon containing from 4 to 9 carbon atoms per molecule and an olefinic dicarboxylic acid consisting of carbon, hydrogen and oxygen and containing not more than 18 carbon atoms per molecule.

2. A halo-substituted polyhydroalkanonaphthalenedicarboxylic acid in which the halogen is selected from the group consisting of chlorine and bromine, said acid resulting from the Diels-Alder condensation, at a temperature of from about 50° C. to about 250° C., of hexachlorocyclopentadiene with the condensation product, formed at a temperature of from about 80° C. to about 250° C., of a conjugated aliphatic diene hydrocarbon containing from 4 to 9 carbon atoms per molecule and an olefinic dicarboxylic acid consisting of carbon, hydrogen and oxygen, and containing not more than 18 carbon atoms per molecule.

3. 5,6,7,8,9,9 - hexachloro - 1,2,3,4,4a,5,8,8a-octahydro-5,8-methano-2,3-naphthalenedicarboxylic acid resulting from the Diels-Alder condensation of 1,2,3,6-tetrahydrophthalic acid with hexachlorocyclopentadiene at an elevated temperature of from about 50° C. to about 250° C.

4. 5,6,7,8,9,9 - hexachloro-2-carboxy-1,2,3,4,4a,5,8,8a-octahydro-5,8-methano-2-naphthaleneacetic acid resulting from the Diels-Alder condensation of (1-carboxy-1,2,3,6-tetrahydrophenyl)acetic acid with hexachlorocyclopentadiene at an elevated temperature of from about 50° C. to about 250° C.

5. 5,6,7,8,9,9 - hexachloro-3-carboxy-1,2,3,4,4a,5,8,8a-octahydro-5,8-methano-2-naphthaleneacetic acid resulting from the Diels-Alder condensation of (2-carboxy-1,2,3,6-tetrahydrophenyl)acetic acid with hexachlorocyclopentadiene at an elevated temperature of from about 50° C. to about 250° C.

6. (5,6,7,8,9,9 - hexachloro-1,2,3,4,4a,5,8,8a-octahydro-4a,5a-dimethyl - 5,8 - methano-2-naphthylmethyl)succinic acid resulting from the Diels-Alder condensation of (1,2,3,6-tetrahydro-4,5-dimethylbenzyl)succinic acid with hexachlorocyclopentadiene at an elevated temperature of from about 50° C. to about 250° C.

7. 5,6,7,8,9,9 - hexachloro-1,2,3,4,4a,5,8,8a-octahydro-5,8-methano-2-naphthalenesuccinic acid resulting from the Diels-Alder condensation of 1,2,3,6-tetrahydrophenylsuccinic acid with hexachlorocyclopentadiene at an elevated temperature of from about 50° C. to about 250° C.

References Cited in the file of this patent

UNITED STATES PATENTS

| | | |
|---|---|---|
| 2,454,351 | Sowa et al. | Nov. 23, 1948 |
| 2,733,248 | Lidov | Jan. 31, 1956 |
| 2,752,361 | Robitschek et al. | June 26, 1956 |
| 2,847,435 | Wiese et al. | Aug. 12, 1958 |

OTHER REFERENCES

Metcalf: "Organic Insecticides" (1955), pp. 233-239.
Metcalf: "Organic Insecticides" (1955), pp. 240-243.